United States Patent [19]

Paganelli

[11] Patent Number: 5,384,366

[45] Date of Patent: Jan. 24, 1995

[54] PROCESS FOR PREPARING ELASTOMERIC THERMOPLASTIC BLENDS AND BLENDS THUS OBTAINED

[75] Inventor: Guido Paganelli, Milano, Italy

[73] Assignee: Alfa Gomma S.P.A., San Damiano DiBrugherio, (MI) Italy

[21] Appl. No.: 92,262

[22] Filed: Jul. 14, 1993

[30] Foreign Application Priority Data

Jul. 17, 1992 [IT] Italy .................. MI 92A 001747

[51] Int. Cl.$^6$ .................. C08L 23/26; C08C 19/00
[52] U.S. Cl. .................. 525/133; 525/194; 525/193; 525/197; 525/198; 525/240; 524/528; 524/483; 523/351
[58] Field of Search .................. 525/133, 197, 194, 198

[56] References Cited

U.S. PATENT DOCUMENTS

| | | | |
|---|---|---|---|
| 4,130,535 | 12/1978 | Coran et al. | 525/232 |
| 4,183,876 | 1/1980 | Coran et al. | 525/197 |
| 4,212,787 | 7/1980 | Matsuda et al. | 525/232 |
| 4,311,628 | 1/1982 | Sabet et al. | 525/133 |
| 4,454,092 | 6/1984 | Shimizu et al. | 525/197 |
| 4,480,074 | 10/1984 | Wang | 525/197 |
| 4,607,074 | 8/1986 | Hazelton et al. | 525/197 |
| 5,157,081 | 10/1992 | Paydak et al. | 525/194 |
| 5,239,000 | 8/1993 | Kim et al. | 525/197 |

*Primary Examiner*—Carman J. Seccuro, Jr.
*Attorney, Agent, or Firm*—Herbert Dubno

[57] ABSTRACT

The present invention relates to a process for preparing elastomeric thermoplastic blends which comprises the following steps:

a) mastication of a blend which comprises a polyolefin elastomer, polyolefin thermoplastic resin and a vulcanizing agent;

b) mastication of a blend which comprises the product obtained in step (a), a polyolefin thermoplastic resin and vulcanizing agent.

24 Claims, No Drawings

PROCESS FOR PREPARING ELASTOMERIC THERMOPLASTIC BLENDS AND BLENDS THUS OBTAINED

FIELD OF THE INVENTION

The present invention relates to a process for preparing thermoplastic elastomeric blends and to the blends thus obtained. More particularly, the expression "thermoplastic elastomeric blends" indicates compounds commonly termed thermoplastic rubbers, i.e. materials which can be shaped by extrusion, injection-molding, calendering etc. with the conventional methods of thermoplastic polymers but have some physical and mechanical properties of vulcanized elastomers.

Even more particularly, the field of the present invention is a process for preparing a specific class of thermoplastic rubbers, i.e. a class constituted by blends of polyolefin resins and polyolefin rubbers vulcanized to varying extents with vulcanizing systems. In general, the expression "vulcanizing system" indicates the blend of a vulcanizing agent with the addition of per se known activators and accelerators.

The products which can be obtained with the process according to the invention therefore comprise a continuous phase, constituted by crystalline polyolefin polymers obtained by polymerization of ethylene, propylene, butene 1,2-methyl, 1-propene, 4-methyl 1-propene etc., typically preferring resins with an isotactic and syndiotactic structure, such as polypropylene and polyethylene, and by a phase which is dispersed in the polyolefin phase and is constituted by dynamically vulcanized particles of EPM and/or EPDM, where EPM is an amorphous elastomeric copolymer obtained from two or more monoolefins, one being ethylene and the other one being polypropylene, but it is also possible to use other monoolefins, including those with the formula $CH_2=CHR$, where R is an alkyl radical with one or more carbon atoms, such as butene-1, hexene-1, 4-methyl pentene-1, etc., and EPDM is an amorphous terpolymer elastomer obtained by copolymerizing the same monomers mentioned for EPM with a conjugated or non-conjugated diene, such as dicyclopentadiene, 1,4-hexadiene, ethylidennorbornene, the weight ratio between polyolefin resin and EPDM and/or EPM elastomer being variable between 4 and 0.15.

Any vulcanizing system applicable for EPM and EPDM polyolefin elastomers can be used, such as for example peroxides such as di(2-tertbutylperoxyisopropyl)benzene, 2.5-dimethyl-2.5-di(tertbutylperoxy)-hexane, dicumile peroxide, possibly in combination with vulcanization co-agents such as sulfur, difurfuralaldazine, glycol-dimethylacrylates, etc., systems based on sulfur donors such as disulphides of tetramethyl-, tetraethyl-, tetrabutyl-, dimethylphenylthiuram, tetra- and hexasulfides of pentamethylenethiuram, N-oxydiethylenedithiocarbamyl, N-oxydiethylenesulfenamide, etc., accelerators such as thiazoles, sulfenamides, guanidines, thiurams, dithiocarbamates, Schiff bases, xanthogenates, activators such as Zn oxide, stearic acid, etc., retardants such as carboxylic acids, phthalic anhydride, etc., phenols or phenolic resins having methylolic groups adjacent to the phenolic group, activated by halogenated polymers, $SnCl_2$ and more generally by so-called Lewis acids or halogenated phenolic resins which have adjacent methylolic groups.

However, EPM in particular cannot be vulcanized by all of the above mentioned vulcanizing agents but only by the peroxides. The remaining above mentioned vulcanizing agents, however, are suitable for the vulcanization of EPDM.

The compound can furthermore contain plasticizer oils, fillers, pigments, lubricants, stabilizers, antioxidants and all the other ingredients conventionally used in the compounding of polyolefin copolymeric rubbers, both as they are and in the so-called oil-extended types provided by manufacturers with plasticizing oil already included.

The above is the field of industrial use of the invention, but said field must not be considered as being limitative, since the process according to the invention can also be used in other equivalent fields in processes for the preparation of thermoplastic elastomeric blends.

BACKGROUND OF THE INVENTION

Prior Art

Processes for preparing blends of polyolefin resins and of polyolefin rubbers are well-known; for example, blends having improved characteristics with respect to simple mechanical mixing can be obtained, according to U.S. Pat. No. 3,758,643, from blends of polyolefin resins and of ethylenepropylene copolymeric elastomers (EPM) or of ethylenepropylene-diene terpolymer elastomers (EPDN) partially vulcanized with peroxides, sulfur, sulfur-based vulcanizing systems and associated activators and accelerators.

Vulcanization of ethylene-propylene-diene terpolymer elastomers with systems constituted by alkylphenolic resins which have methylolic groups adjacent to the phenolic groups and are activated by halogen donors is suggested by U.S. Pat. No. 3,287,440 and is said to provide considerable improvements in mechanical characteristics in U.S. Pat. No. 4,311,628, where it is used to vulcanize blends of polyolefin resins and EPDM elastomers.

Another form of activation of alkylphenolic resins or of phenolic compounds having methylolic groups adjacent to the phenolic group is constituted by carboxylic acids, according to what is described in IT 1203607.

The vulcanization processes by means of which the elastomeric component of the blend constituted by thermoplastic polyolefin resins and EPM and EPDM elastomers is vulcanized by resorting to the above mentioned vulcanizing systems may be of various kinds.

The EPM or EPDM elastomer can be preliminarily partially vulcanized, as described in U.S. Pat. No. 3,758,643, in a steam curing device, in roll-mills, in internal mixers and then mixed with the polyolefin thermoplastic resin at a temperature above the melting temperature of the polyolefin resin, or can be vulcanized completely, in the absence of thermoplastic polyolefins, according to conventional methods, subsequently reducing the product obtained to a powder and mixing it with the polyolefin resin according to what is described by U.S. Pat. No. 4,311,628.

However, the preferred process is dynamic vulcanization, by means of which the polyolefin resin, the polyolefin elastomer, the vulcanizing system and possibly the fillers, pigments, antioxidants and plasticizers are mixed the at vulcanization temperature until vulcanization is completed by using conventional equipment for rubber processing, such as cylinder mixers, Banbury, Brabender or mixing extruders such as Buss, Werner Pfeiderer and the like, as described in EP 107.635.

With the dynamic vulcanization process, all the ingredients, with the exception of the vulcanizing system, are mixed at a sufficiently high temperature and for the time required to obtain thorough mixing of all the components; finally, the vulcanizing system is added and mixing is continued at the temperature and for the time required to obtain the desired degree of vulcanization, as described in U.S. Pat. No. 4,130,535. This last document, in particular, describes a master batch which contains the polyolefin resin and the elastomer. The master batch is partially vulcanized with a reduced amount of vulcanizer, and the product obtained is dynamically reprocessed with an additional amount of vulcanizer.

In compounds in which the vulcanizing system also includes a vulcanizing system activator, the activator is added to the blend prior to the addition of the vulcanizer. In many cases a sort of preliminary master batch is prepared which contains the elastomer and most of the polyolefin resin and of the oil, reserving for a subsequent operation the dynamic vulcanization during which any further amounts of oil and/or polypropylene are added in addition to the vulcanizing system.

The product obtained with the process of dynamic vulcanization substantially consists of particles of vulcanized rubber dispersed in a matrix constituted by the thermoplastic polymer.

The mechanical and physical characteristics of the product obtained depend to a large extent on the dimensions and nature of the vulcanized particles of the elastomer and on their distribution within the thermoplastic matrix.

However, the conditions in which dynamic vulcanization occurs are themselves the cause of a series of drawbacks, including poor thermoplasticity and problems in the shaping of the finished item which arise especially when the ratio between polyolefin elastomer and polyolefin resin is relatively high and the presence of particles which are not perfectly dispersed or have a different hardness than the remaining material is often visible even to the naked eye.

The blend of the polyolefin resin and of the polyolefin elastomer in fact constitutes a heterogenous system, in which each one of the polymeric species acts as dispersant with respect to the other. Addition of the vulcanizing system is performed when the blend of the polymers is at such a temperature as to trigger vulcanization before the system is adequately dispersed in the reaction mass, so that particles of elastomer will find themselves in contact with concentrations of the crosslinking system which are much higher or lower than those required for the proper vulcanization, leading to scorching in some elastomeric particles and to undervulcanization in others.

In fact, considering for example a polyolefin resin based on polypropylene, in order to allow adequate mixing of the vulcanizing system it is obviously necessary to work above the melting temperature of the polypropylene, which melts at 155°–165° C., but in order to obtain the required fluidities it is more convenient to use temperatures not lower than 180° C. and preferably close to or higher than 200° C. At these temperatures, which can be obtained by friction or by heating, vulcanization occurs very quickly. With some vulcanization systems, for example, at 150° C. the required vulcanization time is approximately 30 minutes, but for every increase of 7°–10° C. in temperature the vulcanization rate doubles.

For the same reasons, although some patents, such as for example U.S. Pat. No. 4,130,535, link the crosslinking rate to a given content of non-extractable material, in practice it is very difficult and onerous to control the degree of maximum crosslinking to be obtained. In fact, in order to evaluate this degree one must resort to solution tests in cyclohexane at room temperature or in xylene at boiling point, with rather significant margins of error, considering that olefin elastomers and particularly EPDMs often have, even prior to crosslinking, a certain percentage of gels which must be taken into account in tests conducted in the above mentioned solvents.

It is well-known that in conventional elastomer technology, the use of additives in solid powder form is prevailing whenever possible, and even liquid vuloanizers or vulcanizing systems are preferably absorbed or dispersed in powdery solid substances.

This is due to the fact that the high viscosity of almost all elastomers and the relatively low value of the compounding temperatures generally maintained makes it difficult to easily mix liquids with the elastomer.

However, although vulcanizing systems and their additives are produced as very fine powders and although they are then finely dispersed in the elastomeric, undervulcanization and overvulcanization points may form during vuloanization; the latter, in particular, show up as gels which are visible even to the naked eye in the finished product, especially if it is manufactured by extrusion.

Similar problems arise from the use of vulcanizers constituted by phenols or phenolic resins which have a methylolic group or groups adjacent to the phenolic group, and by phenols or halogenated phenolic resins which have a methylolic group or groups adjacent to the phenol.

These materials are available in the form of solids, flakes or coarse powder; however, their melting point, which is around 45°–55° C., and their considerable stickiness above room temperature make it difficult to rapidly and uniformly disperse the vulcanizer in the elastomer, especially in the conditions of dynamic vulcanization.

It is known to perform a preliminary mixing of these phenolic vulcanizers with polyolefins, subsequently converting the blend into granules. IT 1223262 instead describes the use of a commercially available product constituted by a master batch in powder form produced by the Schenectady company, which contains 50% of the phenolic resin commercially known as SP 1045 and 50% of barium sulphate.

Nevertheless, both are solid particles which must obviously be dispersed in the best possible manner in the elastomer or in blends which contain the elastomer while vulcanization begins simultaneously.

Due to the above, the characteristics of the equipment and more generally of the processes for processing elastomers entail the use of solid materials which are in powder form, or are or can be reduced to a solid powder form during processing. Nevertheless, the achievement of a more close and uniform contact of the vulcanizing system or of its main components with the elastomer to be vulcanized is highly desirable.

OBJECTS OF THE INVENTION

The aim of the present invention is therefore to overcome the above drawbacks and obtain a significant improvement in mechanical properties.

Another object of the present invention is to allow the use of equipment and materials which are known and commonly commercially available.

Another object of the invention is to be able to obtain thermoplastic elastomeric blends which have a low hardness but maintain good mechanical properties.

Another object of the invention is to avoid undervulcanization and overvulcanization, particularly overvulcanization gels.

Another object of the invention is to provide a process which is easy to conduct and maintain.

SUMMARY OF THE INVENTION

This aim and these objects are surprisingly achieved according to a first aspect of the invention by a process for preparing thermoplastic elastomeric blends, characterized in that it comprises the following steps:

a) mastication of a blend which comprises a polyolefin elastomer and a first part of a vulcanizing agent;

b) mastication of a blend which comprises the product obtained from said step (a), a thermoplastic polyolefin resin, and a second part of a vulcanizing agent.

It has been observed that the improvement in mechanical properties can be obtained when at least one part of the vulcanizing system is allowed to react dynamically in a compound in which most of the polyolefin thermoplastic resin is not contained and at least part of the vulcanizing system can thus make contact with the reactive sites of the elastomer without the diluting effect of said polyolefin resin. In a second step, the polyolefin resin is added together with the remaining part of the vulcanizing system.

The compounding can be completed with the possible addition of plasticizing oil and/or additional polyolefin resin; so as to obtain the desired degree of hardness, and of lubricants, antioxidants, pigments, fillers which have not been added in the first step, the addition of fillers being preferably performed in the second step.

Preferably, the degree of vulcanization which can be obtained during said step (a) is such as to produce a product in powder form, in the absence of aggregating agents. This is contrary to the common preconception which exists in the field of rubber processing, according to which it is absolutely not possible to obtain powders in mixers. In this manner it is surprisingly possible to obtain a particularly high maximum tensile stress. If one wishes to avoid practical problems related to the handling of powders, it is possible to add a limited amount of an aggregating agent. The aggregating agent may be formed by thermoplastic polymers or elastomeric polymers which cannot be vulcanized by the vulcanization agent and which can be mixed with the polyolefin resin, with EPM and with EPDM. The aggregating agent is preferably formed by a minor part of the polyolefin thermoplastic product to be introduced in said step (b). According to this preferred embodiment, the process comprises the mastication of the product obtained at the end of said step (a) and of a polyolefin thermoplastic product. However, it has been observed that the quality of the mechanical characteristics tends to decrease as the amount of aggregating agent introduced during step (a) increases.

Preferably the blend of said step a) comprises a polyolefin thermoplastic resin in an amount not higher than 25 PHR, preferably not higher than 15 PHR, more preferably not higher than 8 PHR, considered on the polyolefin elastomer without extension oil.

Preferably the steps a) and b) are performed until vulcanization is substantially complete.

Preferably, said step (a) is performed at a temperature of 70° to 240° C. and more preferably of 180° to 220° C.

Preferably, said step (b) is performed at a temperature of 150° to 240° C. and more preferably of 180° to 220° C.

Preferably, said vulcanizing agent used in said step (a) is present in an amount, by weight, of 25% to 95% with respect to the sum of the amount of vulcanizing agent used in said step (a) plus an amount of vulcanizing agent used in said step (b), and more preferably in an amount, by weight, of 55% to 85% with respect to the same sum.

Preferably, a vulcanizing agent used in said step (b) is present in an amount, by weight, of 5% to 75% with respect to the sum of the amount of vulcanizing agent used in said step (a) plus the amount of vulcanizing agent used in said step (b), and more preferably in an amount, by weight, of 15% to 45% with respect to the same sum.

Preferably, said aggregating agent, preferably a polyolefin thermoplastic material, is used in an amount, by weight, of 0% to 30% and more preferably of 10% to 20% with respect to the weight of said polyolefin elastomeric considered without oil.

Preferably, the process comprises the mastication of the product obtained at the end of said step (a) and of EPM; said polyolefin elastomeric being EPDM; said vulcanizing agent being chosen among vulcanizing agents capable of vulcanizing EPDM but not of vulcanizing EPM.

The aims and the objects of the invention are surprisingly achieved according to a second aspect of the invention by a process for preparing thermoplastic elastomeric blends, characterized in that it comprises a step in which mastication of a blend is performed at a temperature in excess of 180° C. and preferably comprised between 190° and 240° C., said blend comprising a polyolefin elastomer, a polyolefin thermoplastic resin and a vulcanizing agent which is pre-dispersed or pre-dissolved in a dispersant; said dispersant being liquid at a temperature between 25° and 110° C. and preferably between 25° and 80° C.

Preferably the vulcanizing agent is a phenolic resin or an halogenated phenolic resin; a concentration of said phenolic resin in said plasticizing agent being lower than 65%, preferably lower than 40%, more preferably lower than 30%. The vulcanizing agent can be chosen among phenolic compounds and resins which have methylolic groups adjacent to the phenolic group, or halogenated phenolic compounds and resins which have methylolic groups adjacent to the phenolic group, said process comprising a preparation of a solution of said vulcanizing agent in paraffinic plasticizing oil at temperatures between 40° and 130° C., preferably between 50° and 100° C., more preferably between 60° and 80° C.

Preferably the dispersant is chosen among an elastomer, a paraffin, a chloroparaffin, a paraffin and/or naphthenic plasticizer and their blends, and a liquid polybutadiene. The elastomer can be a trans-polyoctenamer.

Preferably the paraffin plasticizer contains no more than 5% of aromatic compounds and 20 to 40% of naphthene compounds.

Preferably said dispersant containing said vulcanizing agent is injected along the extruder in which said mastication is performed.

A solution to the problem of determining and controlling the degree of vulcanization has thus been found by performing the crosslinking of the EPDM rubber in the presence of an elastomer which does not vulcanize in the presence of at least two of the groups of crosslinking systems most commonly used for EPDM, i.e. phenolic resins which have methylolic groups adjacent to the phenolic group and are activated according to the above indicated methods and sulfur-based systems which are fully compatible with EPDM. This elastomer is EPM, which notoriously vulcanizes only with peroxides.

In this manner, total vulcanization is limited at will, on the basis of the amount of EPM introduced, since necessarily the EPM does not vulcanize in the above mentioned conditions. Accordingly, the degree of final vulcanization is preferably less than 90%, even if mastication is carried out until the vulcanization reaction is substantially complete. This characteristic contributes to obtain lower hardnesses while maintaining a high maximum tensile stress.

Preferably, said EPM is used in an amount, by weight, of 5% to 90% and more preferably of 10% to 50% with respect to the weight of said EPDM considered without oil.

It has been observed that the gels originally present in the EPDM and/or EPM receive the addition of those produced by the physical form in which the crosslinking system, or a component thereof, is added to the elastomer or to a blend thereof with the thermoplastic polyolefin and possibly to a thermoplastic polyolefin/EPDM/EPM blend which contains fillers, dark pigments, antioxidants, lubricants, etc.

It has been observed that the above described process allows to pump the dispersing agent which contains the vulcanizing agent with gear pumps, piston pumps, injection pumps or peristaltic pumps.

It has furthermore surprisingly been observed that during mastication, by means of the dynamic vulcanization of thermoplastic elastomeric rubbers and in particular of thermoplastic elastomeric rubbers which contain polyolefin elastomers and thermoplastic polyolefins, the above mentioned dispersing agent can be mixed much more easily than with conventional processes, especially if mastication or dynamic vulcanization is performed in compounding extruders with twin co-rotating screws with two or three starts or with counterrotating screws with two or three starts, in which the injection of the crosslinking solution in a plasticizer which is highly compatible with the elastomer causes the vulcanizer to be molecularly and uniformly distributed in the plasticizer and to be finely distributed in the elastomer, i.e. a condition which is close to that of an ideal single-phase system.

The result is the obtainment of injection and extrusion products which are practically gel-free, with the possibility of good extrusion even at hardness level around 50-55 shore A.

It has furthermore been observed that the use of the solution in paraffin plasticizers of phenolic resins or compounds having methylolic groups adjacent to the phenolic group, or of halogenated phenolic resins or compounds which have methylolic groups adjacent to the phenolic group, produces variations in the flow rate measured according to method ASTM D 1238 as a function of the concentration of the vulcanizer in the paraffin oil solution.

As is known, the flow rate, indicated especially for polyolefins also as the melt flow index (MFI), indicates to a certain extent the higher or lower fluidity of the material at temperatures usually comprised between 190° C. and 230° C., and on the basis of this parameter one chooses the materials meant to be extruded which require a low MFI or those meant for injection molding which require a high MFI. This same parameter can also be used for thermoplastic elastomeric rubbers prepared by dynamic vulcanization starting from EPDM or EPM and blends thereof with thermoplastic polyolefins, with the difference that these materials constitute a heterogeneous system with orders of magnitude of the flow rate which are significantly lower than those observed in polyolefins which do not contain vulcanized rubber particles.

The low fluidity of known vulcanized elastomeric rubbers can be partially improved by using, for example, a polypropylene with MFI, at 230° C. and with 2.16 kg of load, equal to 8 instead of a polypropylene having an MFI equal to 0.9, but in the first case the general mechanical characteristics worsen and the product, although usable for injection molding, does not allow to obtain acceptable extruded products, and in the second case, the preservation of good mechanical properties and good extrusibility combines with difficulties in injection molding.

It has been observed that by varying the concentrations in the plasticizing paraffinic oil of the crosslinking phenolic resin in blends of EPDM and/or EPM with polypropylene having a low MFI, for example lower than or equal to 0.8-0.9, the flow rate varies up to twice the value obtained by the same blend in which the crosslinking phenolic resin is added in the solid state, i.e. not dissolved in paraffinic oil, with considerable advantage for the filling of the molds in injection molding.

DETAILED DESCRIPTION OF THE INVENTION

The following examples are meant to illustrate the invention without limiting it in any way.

The quantities of the various components are expressed by weight. For each example listed in the tables, four specimens were measured with evaluation of root-mean-square deviation. Furthermore, all the tests were performed with the same batch of materials, so that the results are more reliably comparable.

Table 1 lists the results of examples 1-7; Table 2 lists the results of examples 2 and 8-18; Table 3 lists the results of examples 19-28; and Table 4 lists the results of examples 29-32.

Examples 1, 2, 2/1, 2/2, 16, 19, 22, 29 and 32 are comparison examples; all the others are examples according to the invention.

EXAMPLES 1-2/2

An EPDM which contains 100 PHR of plasticizing oil, with 2.5 unsaturation, 72% ethylene content and Mooney viscosity (M=1+4 at 125° C.) equal to 52 is loaded in a 4.2-liter Banbury preheated to 95°±5° C., and after a 4-minute rotation at 110 rpm, required to raise the temperature to 150°-160° C., a polypropylene with MFI (2.16 kg at 210° C.) equal to 8 is added; the temperature is raised to 190°-200° C. in 3 minutes. The antioxidant, the lubricants, the Zn oxide are added to the melted mass and mixed for 2 minutes, followed by the activator, which is also mixed for 2 minutes. Finally, the vulcanizing agent is added; said agent is formed by phenolic resin dissolved beforehand in the plasticizing oil with a 1:1 weight ratio, continuing the treatment for another 4–6 minutes, at the end of which the mass is dumped from the Banbury onto a cylinder mixer and is reduced into a continuous sheet 4–8 mm thick, thus checking its actual thermoplasticity.

Table 1, Examples 2, 2/1, 2/2 list the obtained characteristics together with those of example 1, in which the crosslinking system is fully absent.

EXAMPLE 3

Treatment is divided into two steps. In the first step, the EPDM is loaded into the Banbury, kept at 90°–100° C. under thermostatic control, raised to 150°–160° C. by adjusting the rotor to 30–40 rpm, and then the Zn oxide, the plasticizing oil and the antioxidant are added, whereas the lubricating system is added in terms of 50% of the intended dosage. The rotor of the Banbury is set to such an rpm rate as to raise the temperature to 180°–200° C. for a total of 15–16 minutes, after which the material, in the form of a compact mass, is dumped from the Banbury, weighed again and returned into the Banbury, which in the meantime has been set to 155°±5° C. together with the polypropylene and to the remaining amount of lubricant. In three minutes of treatment at 110 rpm, the material reaches 190°–200° C., and after further mixing for 4–5 minutes the mass is finally unloaded onto the cylinder mixer, where due to its thermoplasticity it is reduced to a sheet 4–8 mm thick.

This process differs from the one of Example 1 in that the preparation is divided into two steps; however, the characteristics are scarcely different.

EXAMPLES 4–6

Treatment is divided into two steps. In the first step, the EPDM is loaded into the Banbury, kept at 90°–100° C., and then the Zn oxide, the resin, the resin activator and the antioxidant are added in an amount equal to a fraction of the amount prescribed by the dosage, whereas the lubricating system is added in the amount of 50% of the prescribed dosage. The rotor of the Banbury is set to such an rpm rate as to maintain the temperature at 90°–100° C. for a total of 15–16 minutes, after which the material, in the form of a compact mass, is dumped from the Banbury, weighed again and returned into the Banbury, which in the meantime has been set to 155°±5° C. together with the polypropylene. In three minutes of treatment at 110 rpm, the material reaches 190°–200° C.; then the remaining part of the Zn oxide, of the antioxidant, of the activator of the phenolic resin and of the lubricant is added, and after 4–5 minutes of mixing the compound is completed with the addition of the remaining part of phenolic resin, continuing to mix for 4–5 minutes and finally dumping the mass onto the cylinder mixer, where by virtue of its thermoplasticity it is reduced into a sheet 4–8 mm thick.

The compound obtained with the process of example 5 shows some improvement in maximum tensile stress when compared with compound 2, which is the most similar in terms of the filling volume of the Banbury and of treatment times, whereas the compound obtained with the process of example 7 is characterized in that part of the polypropylene was introduced during the first step together with 25% of the crosslinking system and has lower properties with respect to compound 5.

EXAMPLES 8–13

Treatment is divided into two steps. In the first step, the EPDM is loaded into the Banbury, set at 90°–100° C. beforehand under thermostatic control, is raised to 150°–160° C., setting the rotor to 30–40 rpm, and then the Zn oxide, the resin, the resin activator and the antioxidant are added in an amount equal to a fraction of the amount prescribed by the dosage, whereas the lubricating system is added in the amount of 50% of the prescribed dosage. After reaching the temperature of 190°–200° C. in 10 minutes, the mass is dumped from the Banbury in powder form, weighed again and returned into the Banbury, which is at 155°–5° C. together with the polypropylene. In three minutes of treatment at 110 rpm, the material reaches 190°–200° C.; then the remaining part of the Zn oxide, of the antioxidant, of the activator of the phenolic resin and of the lubricant is added, and after 4–5 minutes of mixing the compound is completed with the addition of the remaining part of phenolic resin, continuing to mix for 4–5 minutes and finally dumping the mass onto the cylinder mixer, where by virtue of its thermoplasticity it is reduced into a sheet 4–8 mm thick.

Table 2 lists the results obtained by introducing fractions of the crosslinking system equal to 25%, 65% and 100% during the first step, in comparison with compound 2 prepared in a single step, and from these results it can be seen that dividing the addition of the crosslinking agent into two steps, the first of which contains only the elastomer, has led to improvements in the maximum tensile stress on the order of 60% and over.

EXAMPLES 14–15

The process of examples 8–13 is repeated, except that prior to the addition of the fraction of phenolic resin of the first step, the indicated amount of an elastomer which does not react with the crosslinking system is introduced. A certain decrease in maximum tensile stress is observed, but independently of the difficulties in measuring the degree of crosslinking, the maximum amount of crosslinked elastomer present is clearly determined by the fact that a type of elastomer which does not react with the crosslinking system was introduced in the compound.

EXAMPLES 16–18

The process of example 2 and of examples 8–13 respectively is repeated, except that an elastomer which contains chlorine is used as activator. The results indicate a marked improvement in maximum tensile stress by adopting the two-step process.

EXAMPLES 19–25

With the process described for Examples 8–13, the compounds listed in Table 3 with reference to examples 20–21 and 23 to 25 are prepared, whereas compounds 19 and 22 were prepared in a single step, following the process indicated in the comparison example 2.

Even by using a different crosslinking system, the advantages of the invention are confirmed, as indicated by compounds 20, 21 and 23 to 25.

EXAMPLES 26–28

The process of examples 8–13 is repeated, except that a part of polypropylene was added during the first step of example 26 and prior to the addition of the indicated fraction of the crosslinking system, with a considerable reduction in maximum tensile stress, which remains in any case higher than the value obtained in the single-step process of comparison example 22, which contains the same amount of crosslinking agent.

The addition, during the first step of example 27, of the non-reactive elastomer together with the polypropylene returns the maximum tensile stress to values close to those of example 25.

No advantage is obtained with the use, in example 27, of the "reactor modified" propylene type commercially known as Hifax CA 22.

EXAMPLES 29-32

Compounds 30 and 31 were prepared with the process described in examples 8 to 13; these compounds contain the vulcanizer, which is constituted by phenolic resin, without the related activator, proving the advantage of the process according to the invention even in comparison with the comparison examples of compounds 29 and 32.

EXAMPLE 33

A master batch is prepared in a Banbury in 8.5 minutes at 185° C.; the master batch contains 175 parts of an EPDM with 65% ethylene and 5.5 parts of oil-extended ENB with 75 phr of plasticizing oil, 30.6 parts of polypropylene with MFI-0.9, 5.7 parts of ZnO, 19.7 parts of paraffin oil, 0.525 parts of lubricants, 8.8 parts of kaolin, 0.3 parts of antioxidant, 1.8 parts of titanium dioxide, 1.62 parts of an activator containing 50% chloroprene, 1.62 parts of a crosslinking master A containing 8 parts of SP 1045 phenolic resin and 3 parts of SP 1055 chlorinated phenolic resin dissolved at 80° C. in 16 parts of paraffinic plasticizing oil.

A Banbury with a useful volume of 3.2 liters is loaded, according to the dosage indicated in Table 5, with EPDM, polypropylene, antioxidant, plasticizing oil and, after mixing at 110 rpm for 1.5 minutes, the activator is added at 185° C. and the SP 1045 and SP 1055 phenolic resins, dissolved beforehand at 80° C. in the plasticizing oil, are added at 190° C., unloading the blend at 218°-220° C. after a total cycle of 6 minutes; immediately after dumping, the blend is passed between the cylinders of a roller-mill heated at 180°-185° C. and is converted into a sheet 4-5 mm thick.

After cooling, the sheet is shredded in a cutter mill.

Granules of the material having dimensions suitable for loading the cylinder of the test apparatus are subjected to measurement of the flow rate according to the methods ASTM 1238 type A and B at the temperature of 200° C. and with a load of 10.2 kg, which is approximately double of the load prescribed by the specification at this temperature in order to reduce the margin of error in weighing.

As listed in Table 5, a value of 1,234 g/10 minutes (flow rate-method A) was obtained, whereas with 5 kg of weight a value equal to 0.1 g/10 minutes had been measured; since this number is obtained by multiplying by 10 the average of the weights of the material extruded from the apparatus in time intervals equal to 1 minute, i.e. approximately 0.01 g, the imprecision which arises from the use of a 5-kg load is evident.

The material was injection-molded, obtaining the sheets from which the specimens were obtained to determine the mechanical properties, whereas the sprue obtained during this molding was used for automatic measurement of the flow rate (method B) by loading it directly into the melt-indexer test cylinder, thus having available for measurement a material without air interposed, as is the case for granules used with method A (manual method).

EXAMPLE 34-37

The procedure is the same one followed for example 33, with the difference that the phenolic blend was added in the form of paraffinic plasticizer solutions, indicated as crosslinking master, at various concentrations of said phenolic blend.

In example 37, crosslinking master D contains all the oil to be added to the blend.

As can be seen from the values of the flow rate (A), the solution of phenolic blend with the lowest concentration provides a value approximately 50% higher, and an increase of over 100% is observed in the test (flow-rate B) on the feedhead of the same material which was injection-molded, i.e. in the physical form in which the material is more compact.

EXAMPLE 38

Crosslinking master E was used in this example; it has a lower phenolic resin concentration than crosslinking master D of example 37, and therefore formula 38 contains approximately 20 parts more of plasticizing oil than the formulas of examples 33 to 37.

The mechanical characteristics and the hardness of formula 38 are conspicuously different from those of formulas 33 to 37, which have substantially similar mechanical characteristics and hardness. The characteristics of all formulas from 33 to 38 have been determined on specimens obtained from injection-molded sheets.

The flow rate of formula 38, determined according to method A, increases with respect to that of formula 37 but it is most of all in the determination using method B that there is a very significant difference with respect to the other formulas.

The higher amount of plasticizing oil contained in formula 38 does not justify an increase in flow rate which is on the order of approximately 10 times with respect to formula 33, in which the resin was used in the solid state.

TABLE 1

| Example no. | Comparison | | | | 3 | 4 | 5 | 6 | 7 |
| --- | --- | --- | --- | --- | --- | --- | --- | --- | --- |
|  | 1 | 2 | 2/1 b) | 2/2 c) | | | | | |
| TOTAL VULCANIZER a) | 0 | 12,5 | 12,5 | 12,5 | 0 | 12,5 | 12,5 | 12,5 | 12,5 |
| STEP I (vulcanizer %) | 0 | 100 | 100 | 100 | 0 | 15 | 25 | 35 | 25 |
| Banbury °C. | 180/200 | 180/200 | 180/200 | 180/200 | 180/200 | 90/100 | 90/100 | 90/100 | 90/100 |
| oil-extended EPDM | 200 | 200 | 200 | 200 | 200 | 200 | 200 | 200 | 200 |
| EPM | — | — | — | — | — | — | — | — | — |
| HIFAX CA 22 | — | — | — | — | — | — | — | — | — |
| POLYPROPYLENE | 53 | 53 | 53 | 53 | — | — | — | — | 30 |
| Zn OXIDE | 13 | 13 | 13 | 13 | 13 | 1,95 | 3,25 | 4,55 | 3,25 |
| PHENOLIC RESIN | — | 12,5 | 12,5 | 12,5 | — | 1,88 | 3,13 | 4,38 | 3,14 |

TABLE 1-continued

| Example no. | Comparison 1 | 2 | 2/1 b) | 2/2 c) | 3 | 4 | 5 | 6 | 7 |
|---|---|---|---|---|---|---|---|---|---|
| ACTIVATOR I d) | — | 3 | 3 | 3 | — | 0,45 | 0,75 | 1,05 | 0,75 |
| SULFUR SYSTEM | — | — | — | — | — | — | — | — | — |
| ACTIVATOR II | — | — | — | — | — | — | — | — | — |
| PARAFFIN PLASTICIZER | 47 | 41 | 41 | 41 | 47 | 46 | 45 | 45 | 45 |
| ANTIOXIDANT | 1,3 | 1,3 | 1,3 | 1,3 | 1,3 | 0,2 | 0,33 | 0,46 | 0,33 |
| STEARIC ACID | 0,2 | 0,5 | 0,5 | 0,5 | 0,1 | 0,25 | 0,25 | 0,25 | 0,25 |
| Ca STEARATE | 0,2 | 0,5 | 0,5 | 0,5 | 0,5 | 0,1 | 0,25 | 0,25 | 0,25 |
| TOTAL WEIGHT | 314,7 | 324,55 | 324,55 | 324,55 | 261,5 | 251,053 | 253,088 | 255,743 | 283,388 |
| STEP II (vulcanizer %) | 0 | 0 | 0 | 0 | 0 | 85 | 75 | 65 | 75 |
| POLYPROPYLENE | — | — | — | — | 33 | 33 | 53 | 53 | 23 |
| Zn OXIDE | — | — | — | — | — | 11,05 | 9,75 | 8,45 | 9,75 |
| PHENOLIC RESIN | — | — | — | — | — | 10,63 | 9,38 | 8,13 | 9,38 |
| ACTIVATOR I d) | — | — | — | — | — | 2,55 | 2,25 | 1,95 | 2,25 |
| SULFUR SYSTEM | — | — | — | — | — | — | — | — | — |
| ACTIVATOR II | — | — | — | — | — | — | — | — | — |
| ANTIOXIDANT | — | — | — | — | — | — | — | — | — |
| STEARIC ACID | — | — | — | — | 0,1 | 0,25 | 0,25 | 0,25 | 0,25 |
| Ca STEARATE | — | — | — | — | 0,1 | 0,25 | 0,25 | 0,25 | 0,25 |
| TOTAL WEIGHT | 0 | 0 | 0 | 0 | 53,2 | 77,73 | 74,88 | 72,03 | 44,88 |
| SHORE A points | 43 | 60 | 59 | 58 | 43 | 62 | 61 | 60 | 55 |
| Modulus at 50% MPa | 0,85 | 1,44 | 1,41 | 1,47 | 0,77 | 2,1 | 1,62 | 1,56 | 1,2 |
| Modulus at 100% MPa | 0,95 | 2 | 1,98 | 2,02 | 0,87 | 2,8 | 2,33 | 2,18 | 2 |
| Modulus at 200% MPa | 1,16 | 3 | 3,01 | 2,95 | 1,07 | | 3,5 | 3,14 | 3,46 |
| Modulus at 300% MPa | 1,35 | 3,81 | 3,85 | 3,7 | 1,26 | | | 4,03 | |
| Modulus at 400% MPa | 1,53 | | 4,62 | | 1,41 | | | 5,11 | |
| MAXIMUM TENSILE STRESS MPa | 1,87 | 4,71 | 5 | 3,87 | 1,61 | 3,7 | 4,53 | 5,42 | 3,71 |
| ULTIMATE ELONGATION % | 819,7 | 434 | 456 | 334 | 700 | 203 | 296 | 423 | 319 | a) on 200 parts of oil-extended EPDM, the vulcanizer is constituted by a 50% solution of phenolic resin in paraffin plasticizer.
b) doubling of the treatment time.
c) Banbury filling volume equal to 3300 $cm^3$
d) Lewis acids with pKa >/= 2.98 such as e.g. hydroxybenzoic acid.

TABLE 2

| Example no. | Comparison 4 | 8 b) | 9 b) | 10 c) | 11 e) | 12 | 13 | 14 | 15 | 16 | 17 | 18 |
|---|---|---|---|---|---|---|---|---|---|---|---|---|
| TOTAL VULCANIZER a) | 12,5 | 12,5 | 12,5 | 12,5 | 12,5 | 12,5 | 12,5 | 12,5 | 12,4 | 12,5 | 12,5 | 12,5 |
| STEP I (vulcanizer %) | 100 | 25 | 25 | 25 | 25 | 65 | 100 | 100 | 100 | 100 | 25 | 65 |
| Banbury °C. | 180/200 | 180/200 | 180/200 | 180/200 | 180/200 | 180/200 | 180/200 | 180/200 | 180/200 | 180/200 | 180/200 | 180/200 |
| oil-extended EPDM | 200 | 200 | 200 | 200 | 200 | 200 | 200 | 200 | 200 | 200 | 200 | 200 |
| EPM | — | — | — | — | — | — | — | 50 | 100 | — | — | — |
| HIFAX CA 22 | 53 | — | — | — | — | — | — | — | — | 53 | — | — |
| POLYPROPYLENE | 13 | 3,25 | 3,25 | 3,25 | 3,25 | 3,45 | 13 | 13 | 13 | 6 | 1,5 | 3,9 |
| Zn OXIDE | 12,5 | 3,13 | 3,13 | 3,13 | 3,13 | 8,123 | 12,5 | 12,5 | 12,5 | 12,5 | 3,125 | 8,125 |
| PHENOLIC RESIN | 3 | 0,75 | 0,75 | 0,75 | 0,75 | 1,95 | 2,9 | 2,9 | 2,9 | — | — | — |
| ACTIVATOR I d) | — | — | — | — | — | — | — | — | — | — | — | — |
| SULFUR SYSTEM | — | — | — | — | — | — | — | — | — | — | — | — |
| ACTIVATOR II | 41 | 45 | 45 | 45 | 45 | 43 | 41 | 41 | 41 | 1,5 | 0,375 | 0,975 |
| PARAFFIN PLASTICIZER | | | | | | | | | | 35 | 44 | 39 |
| ANTIOXIDANT | 1,3 | 0,33 | 0,33 | 0,33 | 0,33 | 0,95 | 1,3 | 1,3 | 1,3 | 1,3 | 0,33 | 0,85 |
| STEARIC ACID | 0,5 | 0,25 | 0,25 | 0,25 | 0,25 | 0,25 | 0,25 | 0,25 | 0,25 | 0,2 | 0,1 | 0,1 |
| Ca STEARATE | 0,5 | 0,25 | 0,25 | 0,25 | 0,25 | 0,25 | 0,25 | 0,25 | 0,25 | 0,2 | 0,1 | 0,1 |
| TOTAL WEIGHT | 330,8 | 294,95 | 254,95 | 294,95 | 254,95 | 266,87 | 277,2 | 327,2 | 377,2 | 321,7 | 252,525 | 261,045 |
| STEP II (vulcanizer %) | 0 | 75 | 75 | 85 | 85 | 35 | 0 | 0 | 0 | 0 | 75 | 35 |
| POLYPROPYLENE | — | 53 | 53 | 53 | 53 | 53 | 53 | 53 | 53 | — | 53 | 53 |
| Zn OXIDE | — | 9,75 | 9,75 | 9,75 | 9,75 | 4,55 | — | — | — | — | 4,5 | 2,1 |
| PHENOLIC RESIN | — | 9,38 | 9,38 | 9,38 | 9,38 | 4,38 | — | — | — | — | 9,38 | 4,38 |
| SULFUR SYSTEM | — | 2,25 | 2,25 | 2,25 | 2,25 | 1,05 | — | — | — | — | — | — |
| ACTIVATOR II | — | — | — | — | — | — | — | — | — | — | — | — |
| ANTIOXIDANT | — | — | — | — | — | — | — | — | — | — | 1,15 | 0,33 |
| STEARIC ACID | — | 0,25 | 0,25 | 0,25 | 0,25 | 0,25 | 0,25 | 0,25 | 0,25 | — | 0,98 | 0,46 |
| Ca STEARATE | — | 0,25 | 0,25 | 0,25 | 0,25 | 0,25 | 0,25 | 0,25 | 0,25 | — | 0,1 | 0,1 |
| | | | | | | | | | | | 0,1 | 0,1 |
| TOTAL WEIGHT | 0 | 74,88 | 74,88 | 74,88 | 74,88 | 63,48 | 53,5 | 53,5 | 53,5 | 0 | 69,18 | 60,66 |
| SHORE A points | 60 | 37 | 58 | 38 | 58 | 60 | 56 | 55 | 54 | 50 | 57 | 56 |
| Modulus at 50% MPa | 1,44 | 1,41 | 1,39 | 1,4 | 1,46 | 1,52 | 1,19 | 1,46 | 1,17 | 1,09 | 1,46 | 1,29 |
| Modulus at 100% MPa | 2 | 2,06 | 2 | 2,04 | 2,14 | 2,17 | 1,58 | 1,93 | 1,51 | 1,56 | 2,13 | 1,85 |
| Modulus at 200% MPa | 3 | 3,33 | 3,2 | 3,26 | 3,38 | 3,29 | 2,57 | 2,72 | 2,1 | 2,48 | 3,34 | 2,83 |
| Modulus at 300% MPa | 3,81 | 4,74 | 4,44 | 4,43 | 4,63 | 4,51 | 3,55 | 3,62 | 2,77 | — | 4,49 | 3,85 |
| Modulus at 400% MPa | — | — | — | — | — | 5,94 | 4,59 | 4,73 | 3,52 | — | — | 5,03 |
| MAXIMUM TENSILE STRESS MPa | 4,71 | 5,35 | 5,35 | 5,34 | 5,63 | 7,97 | 6,61 | 5,4 | 4,83 | 3,83 | 3,19 | 6,85 |
| ULTIMATE ELONGATION % | 434 | 344 | 374 | 379 | 379 | 518 | 527 | 455 | 557 | 369 | 363 | 525 | a) on 200 parts of oil-extended EPDM; the vulcanizer is constituted by a 50% solution of phenolic resin in paraffin plasticizer.
b) Banbury filling volume equal to 2580 cm³
c) Lewis acids with pKa </= 2.98 such as e.g. hydroxybenzoic acid.
d)
e) chloroprene elastomer.

TABLE 3

| Example no. | Comparison 19 | 20 | Comparison 21 | 22 | 23 | 24 | 25 | 26 | 27 | HIFAX 28 |
|---|---|---|---|---|---|---|---|---|---|---|
| TOTAL VULCANIZER a) | 3,9 | 2,9 | 1,9 | 0,9 | 0,9 | 0,9 | 0,9 | 0,9 | 0,9 | 0,9 |
| STEP I (vulcanizer %) | 100 | 6 | 38 | 100 | 25 | 65 | 100 | 65 | 65 | 65 |
| Banbury °C. | 180/200 | 180/200 | 180/200 | 180/200 | 180/200 | 180/200 | 180/200 | 180/200 | 180/200 | 180/200 |
| oil-extended EPDM | 200 | 200 | 200 | 200 | 200 | 200 | 200 | 200 | 200 | 200 |
| EPM | — | — | — | — | — | — | — | — | 10 | — |
| HIFAX CA 22 | — | — | — | — | — | — | — | — | — | 25 |
| POLYPROPYLENE | 53 | — | — | 53 | — | — | — | 15 | 15 | — |
| Zn OXIDE | 6 | 0,36 | 1,68 | 6 | 1,5 | 2,9 | 6 | 3,9 | 3,9 | 3,9 |
| PHENOLIC RESIN | — | — | — | — | — | — | — | — | — | — |
| ACTIVATOR I d) | — | — | — | — | — | — | — | — | — | — |
| SULFUR SYSTEM | 3,5 | 0,174 | 0,532 | 0,9 | 0,223 | 0M,585 | 0,9 | 0,585 | 0,585 | 0,585 |
| ACTIVATOR II | — | — | — | — | — | — | — | — | — | — |
| PARAFFIN PLASTICIZER | 47 | 47 | 47 | 47 | 47 | 47 | 47 | 47 | 47 | 47 |
| ANTIOXIDANT | 1,3 | 0,1 | 0,36 | 1,3 | 0,33 | 0,85 | 1,3 | 0,85 | 0,85 | 0,85 |
| STEARIC ACID | 0,2 | 0,1 | 0,1 | 0,2 | 0,1 | 0,1 | 0,1 | 0,1 | 0,1 | 0,1 |
| Ca STEARATE | 0,2 | 0,1 | 0,1 | 0,2 | 0,1 | 0,1 | 0,1 | 0,1 | 0,1 | 0,1 |
| TOTAL WEIGHT | 311,6 | 247,83 | 249,776 | 255,6 | 249,25 | 252,53 | 255,4 | 267,53 | 277,53 | 277,53 |
| STEP II (vulcanizer %) | 0 | 94 | 72 | 0 | 75 | 35 | 0 | 15 parts | 15 parts | 15 parts |
| POLYPROPYLENE | — | 53 | 53 | — | 53 | 53 | 53 | 38 | 38 | 38 |
| Zn OXIDE | — | 5,64 | 4,32 | — | 4,5 | 2,1 | — | 2,1 | 2,1 | 2,1 |
| PHENOLIC RESIN | — | — | — | — | — | — | — | — | — | — |
| ACTIVATOR I d) | — | — | — | — | — | — | — | — | — | — |
| SULFUR SYSTEM | — | 2,73 | 1,37 | — | 0,68, | 0,32 | 0,32 | 0,32 | 0,32 | 0,32 |
| ACTIVATOR II | — | — | — | — | — | — | — | — | — | — |
| ANTIOXIDANT | — | 1,22 | 0,94 | — | 0,98 | 0,46 | — | 0,46 | 0,46 | 0,46 |
| STEARIC ACID | — | 0,1 | 0,1 | — | 0,1 | 0,1 | 0,1 | 0,1 | 0,1 | 0,1 |
| Ca STEARATE | — | 0,1 | 0,1 | — | 0,1 | 0,1 | 0,1 | 0,1 | 0,1 | 0,1 |
| TOTAL WEIGHT | 0 | 52,79 | 39,82 | 0 | 59,35 | 56,07 | 53,2 | 41,07 | 41,07 | 41,07 |
| SHORE A points | 63 | 57 | 56 | 54 | 56 | 53 | 56 | 56 | 55 | 50 |
| Modulus at 50% MPa | 1,68 | 1,6 | 2,82 | 1,26 | 1,3 | 1,18 | 1,39 | 1,26 | 1,11 | 1,09 |
| Modulus at 100% MPa | 2,24 | 2,41 | 3,5 | 1,68 | 1,83 | 1,75 | 1,85 | 1,83 | 1,61 | 1,56 |
| Modulus at 200% MPa | 3,07 | 4,39 | 4,97 | 2,37 | 2,68 | 2,78 | 2,83 | 3,93 | 2,53 | 2,48 |
| Modulus at 300% MPa | 3,9 | | 6,76 | 3,02 | 3,71 | 3,8 | 3,85 | 4,11 | 3,47 | 3,28 |
| Modulus at 400% MPa | 4,96 | | | 0 | 4,73 | 5,01 | 5,03 | 0 | 4,49 | 0 |
| MAXIMUM TENSILE STRESS MPa | 6,16 | 6,83 | 8,98 | 4,39 | 5,46 | 7,15 | 6,85 | 5,22 | 6,65 | 3,87 |
| ULTIMATE ELONGATION % | 481 | 389 | 510 | 487 | 466 | 531 | 523 | 394 | 583 | 369,2 | a) on 200 parts of oil-extended EPDM
b) Sulfur system; sulfur = 50%; TMTD (tetramethyltiurame disulfide) = 33.3%; MBTS (tetramethyltiurame disulfide) = 16.7%.

TABLE 4

| Example no. | Comparison 29 | 30 | 31 | Comparison 32 |
|---|---|---|---|---|
| TOTAL VULCANIZER (a) | 12,5 | 12,5 | 12,5 | 12,5 |
| STEP I (vulcanizer %) | 100 | 25 | 65 | 100 |
| Banbury °C. | 180/200 | 180/200 | 180/200 | 180/200 |
| oil-extended EPDM | 200 | 200 | 200 | 200 |
| EPM | — | — | — | — |
| HIFAX CA 22 | — | — | — | — |
| POLYPROPYLENE | 50 | — | — | 50 |
| Zn OXIDE | 10 | 2,5 | 6,5 | 10 |
| PHENOLIC RESIN | 12,5 | 3,125 | 8,125 | 12,5 |
| ACTIVATOR I d) | — | — | — | 3 |
| SULFUR SYSTEM | — | — | — | — |
| ACTIVATOR II | — | — | — | — |
| PARAFFIN PLASTICIZER | 38 | 42 | 40 | 38 |
| ANTIOXIDANT | 1,3 | 0,33 | 0,85 | — |
| STEARIC ACID | 0,2 | 0,1 | 0,1 | 0,2 |
| Ca STEARATE | 0,2 | 0,1 | 0,1 | 0,2 |
| TOTAL WEIGHT | 318,2 | 250,15 | 259,67 | 319,9 |
| STEP II (vulcanizer %) | 0 | 75 | 35 | 0 |
| POLYPROPYLENE | — | 50 | 50 | — |
| Zn OXIDE | — | 7,5 | 3,5 | — |
| PHENOLIC RESIN | — | 9,38 | 4,38 | — |
| ACTIVATOR I d) | — | — | — | — |
| SULFUR SYSTEM | — | — | — | — |
| ACTIVATOR II | — | — | — | — |
| ANTIOXIDANT | — | — | — | — |
| STEARIC ACID | — | 0,1 | 0,1 | — |
| Ca STEARATE | — | 0,1 | 0,1 | — |
| TOTAL WEIGHT | 0 | 67,08 | 58,08 | 0 |
| SHORE A points | 55 | 57 | 55 | 56 |
| Modulus at 50% MPa | 1,14 | 1,27 | 1,04 | 1,24 |
| Modulus at 100% MPa | 1,52 | 1,73 | 1,48 | 1,85 |
| Modulus at 200% MPa | 2,19 | 2,65 | 2,42 | 2,96 |
| Modulus at 300% MPa | 2,76 | 3,53 | 3,48 | 4,03 |
| Modulus at 400% MPa | 3,26 | 4,36 | 4,57 | |
| MAXIMUM TENSILE STRESS MPa | 3,84 | 4,9 | 5,65 | 4,4 |
| ULTIMATE ELONGATION % | 542 | 482 | 507 | 341 | a) on 200 parts of oil-extended EPDM; the vulcanizer is constituted by a 50% solution of phenolic resin in paraffin plasticizer.
b) Lewis acids with pKa $\leq$ 2.98 such as e.g. hydroxybenzoic acid.

TABLE 5

|  | 33 | 34 | 35 | 36 | 37 | 38 |
|---|---|---|---|---|---|---|
| MASTER BATCH | 246 | 246 | 246 | 246 | 246 | 246 |
| POLYPROPYLENE (a) | 22 | 22 | 22 | 22 | 22 | 22 |
| ZnO | 0,8 | 0,8 | 0,8 | 0,8 | 0,8 | 0,8 |
| CROSSLINKING MASTER A (b) | — | 11,9 | — | — | — | — |
| CROSSLINKING MASTER B (b) | — | — | 23,9 | — | — | — |
| CROSSLINKING MASTER C (b) | — | — | — | 33,9 | — | — |
| CROSSLINKING MASTER D (b) | — | — | — | — | 48,9 | — |
| CROSSLINKING MASTER E (b) | — | — | — | — | — | 68.6 |
| PHENOLIC MIXTURE (c) | 5,5 | — | — | — | — | — |
| ACTIVATOR III (d) | 3 | 3 | 3 | 3 | 3 | 3 |
| PLASTICIZING OIL | 45 | 37 | 25 | 15 | 0 | 0 |
| TOTAL | 322,3 | 320,7 | 320,7 | 320,7 | 320,7 | 340,4 |
| TOTAL OF PHENOLIC MIXTURE (e) | 6,15 | 5,5 | 6,15 | 6,15 | 6,15 | 6,15 |
| PHENOLIC MIXTURE % DISSOLVED IN OIL | 100 | 40,7 | 21,6 | 15,5 | 10,9 | 7,8 |
| FREE ADDED OIL | 45 | 37 | 25 | 15 | 0 | 0 |
| TOTAL ADDED OIL | 45 | 55 | 55 | 55 | 55 | 64 |
| SHORE A points | 67 | 66 | 67 | 67 | 67 | 60 |
| Modulus at 50% MPa | 1,79 | 1,73 | 1,8 | 1,75 | 1,78 | 1,4 |
| Modulus at 100% MPa | 2,31 | 2,22 | 2,31 | 2,25 | 2,29 | 1,8 |
| Modulus at 200% MPa | 3,37 | 3,08 | 3,18 | 3,13 | 3,19 | 2,51 |
| Modulus at 300% MPa | 4,29 | 3,98 | 4,05 | 4,05 | 4,13 | 3,24 |
| Modulus at 400% MPa | 5,46 | 4,99 | 4,97 | 5,06 | 5,19 | 4,03 |
| MAXIMUM TENSILE STRESS MPa | 6,12 | 5,77 | 5,53 | 6,21 | 6 | 4,47 |
| ULTIMATE ELONGATION % | 451 | 472 | 462 | 500 | 472 | 458 |
| FLOW RATE(A) g/10 minutes | 1,25 | 1,39 | 1,25 | 1,33 | 1,82 | 2,2 |
| FLOW RATE(B) g/10 minutes | 1,25 | — | 1,98 | — | 2,6 | 10,0 |

(a) polypropylene homopolymer with MPI = 0.9.
(b) All masters contain the same kind of mixture of phenolic resins of Schenectady SP 1045 and SP 1055 in a 73/27 ratio.
(c) Mixture of phenolic resins equal to that contained in masters (b).
(d) Master containing 50% chloroprene by weight.
(e) Also includes the amount contained in the master batch.

I claim:

1. A process for preparing a thermoplastic elastomeric blend comprising the steps of:
    (a) masticating and subjecting to dynamic vulcanization a blend comprising a polyolefin elastomer selected from the group consisting of copolymers of two or more monoolefins and copolymers of two or more monoolefins and a diene, a first part of a vulcanizing agent, and a crystalline polyolefin thermoplastic resin in an amount not higher than 25 PHR, considered on the polyolefin elastomer without extension oil;
    (b) thereafter masticating and subjecting to dynamic vulcanization a blend comprising the product obtained from step (a), a crystalline thermoplastic polyolefin resin in a amount not higher than 53 PHR and a second part of a vulcanizing agent; and
    (c) proportioning said vulcanizing agent between steps (a) and (b) so that the amount of the vulcanizing agent used in step (a) is in an amount by weight of 25% to 85% with respect to the sum of said first part of vulcanizing agent used in said step (a) plus said second part of vulcanizing agent used in said step (b).

2. The process defined in claim 1 wherein said blend of said step (a) comprises a polyolefin thermoplastic resin in an amount not higher than 15 PHR, considered on the polyolefin elastomer without extension oil.

3. The process defined in claim 1 wherein steps (a) and (b) are performed until vulcanization is substantially complete.

4. The process defined in claim 1 wherein vulcanization is carried out during said step (a) so as to produce a product in powder form.

5. The process defined in claim 1 wherein step (a) is performed at a temperature of 70° to 240° C.

6. The process defined in claim 1 wherein step (b) is performed at a temperature of 150° to 240° C.

7. The process defined in claim 1 wherein said vulcanizing agent used in said step (a) is in an amount by weight of 55% to 85% with respect to the sum of the amount of vulcanizing agent used in said step (b).

8. The process defined in claim 1 wherein a vulcanizing agent used in said step (b) is present in an amount by weight of 15% to 45% with respect to the sum of the amount of vulcanizing agent used in step (a) plus an amount of vulcanizing agent used in step (b).

9. The process defined in claim 1, further comprising the mastication of the product obtained at the end of said step (a) and of an aggregating agent capable of aggregating said powder and formed by a polyolefin thermoplastic resin.

10. The process defined in claim 9 wherein said aggregating agent is used in an amount by weight up to 30% with respect to the weight of said polyolefin elastomer, considered without extension-oil.

11. The process defined in claim 1, further comprising the mastication of the product obtained at the end of said step (a) and of EPM; said polyolefin elastomer being EPDM; said vulcanizing agent being chosen from vulcanizing agents capable of vulcanizing EPDM but not of vulcanizing EPM.

12. The process defined in claim 11 wherein said EPM is used in an amount by weight of 5% to 90% with respect to the weight of said EPDM, considered without oil.

13. The process defined in claim 1 wherein at least one additive selected from the group consisting of plasticizing oil, further polyolefin resin, lubricants, antioxidants, pigments and fillers is added to said step (b).

14. The process defined in claim 11, wherein the step of masticating the blend in steps (a) and (b) is performed at a temperature in excess of 180° C., said blend comprising a polyolefin elastomer, a polyolefin thermoplastic resin and a vulcanizing agent which is pre-dispersed or pre-dissolved in a dispersant; said dispersant being liquid at a temperature between 25° and 110° C.

15. The process defined in claim 14 wherein said vulcanizing agent is a phenolic resin or an halogenated phenolic resin; the concentration of said phenolic resin in said dispersant agent being lower than 65%.

16. The process defined in claim 14 wherein said vulcanizing agent is selected from the group consisting of phenolic compounds and resins which have methylolic groups adjacent to the phenolic group, and halogenated phenolic compounds and resins which have methylolic groups adjacent to the phenolic group, said process comprising preparing a solution of said vulcanizing agent in paraffinic plasticizing oil at temperatures between 40° and 130° C.

17. The process defined in claim 14 wherein said dispersant is selected from the group consisting of an elastomer, a paraffin, a chloroparaffin, a naphthenic plasticizer, blends of naphthenic plasticizer and paraffin, and a liquid polybutadiene.

18. The process defined in claim 17 wherein said elastomer is a trans-polyoctenamer.

19. The process defined in claim 17 wherein said dispersant in a blend of paraffin and 20% to 40% of naphthene compounds.

20. The process defined in claim 14 wherein said mastication is performed in a twin screw extruder.

21. The process defined in claim 14 wherein the degree of final vulcanization is less than 90% and the vulcanization reaction is substantially complete.

22. The process defined in claim 1 wherein said elastomer is EPM or EPDM.

23. The process defined in claim 14 in which said dispersant containing said vulcanizing agent is injected in an extruder in which said mastication is performed.

24. The process defined in claim 1 wherein said blend of said step (a) comprises a polyolefin thermoplastic resin in an amount not higher than 8 PHR considered on the polyolefin elastomer without extension oil.

\* \* \* \* \*